(12) United States Patent
Warden et al.

(10) Patent No.: US 9,030,670 B2
(45) Date of Patent: May 12, 2015

(54) APPARATUS AND METHOD FOR MEASURING DISTANCE

(75) Inventors: Matthew Warden, Oxford (GB); David Urner, Oxford (GB)

(73) Assignee: Isis Innovation Limited, Oxfordshire (GB)

( * ) Notice: Subject to any disclaimer, the term of this patent is extended or adjusted under 35 U.S.C. 154(b) by 121 days.

(21) Appl. No.: 13/817,626

(22) PCT Filed: Jul. 22, 2011

(86) PCT No.: PCT/GB2011/051399
§ 371 (c)(1),
(2), (4) Date: Feb. 19, 2013

(87) PCT Pub. No.: WO2012/022956
PCT Pub. Date: Feb. 23, 2012

(65) Prior Publication Data
US 2013/0148129 A1    Jun. 13, 2013

(30) Foreign Application Priority Data
Aug. 19, 2010 (GB) .................................. 1013896.4

(51) Int. Cl.
*G01B 11/02* (2006.01)
*G01B 9/02* (2006.01)
*G01B 11/14* (2006.01)

(52) U.S. Cl.
CPC ............ *G01B 11/14* (2013.01); *G01B 9/02004* (2013.01); *G01B 9/02007* (2013.01); *G01B 9/0207* (2013.01); *G01B 2290/60* (2013.01)

(58) Field of Classification Search
CPC ........... G01B 9/02004; G01B 9/02007; G01B 9/0207; G01B 2290/60; G01B 11/14

USPC ......................................... 356/485, 486, 498
See application file for complete search history.

(56) References Cited

U.S. PATENT DOCUMENTS 4,984,898 A * 1/1991 Hofler et al. ................. 356/498
5,521,704 A    5/1996 Thiel et al.
(Continued)

FOREIGN PATENT DOCUMENTS

EP    1750086    2/2007
FR    2765964    1/1999
(Continued)

OTHER PUBLICATIONS

Intellectual Proprty Office, "Search Report", "from GB Application No. 1013896.4", Nov. 16, 2010, pp. 1-3, Published in: GB.
(Continued)

*Primary Examiner* — Michael A Lyons
(74) *Attorney, Agent, or Firm* — Fogg & Powers LLC (57) ABSTRACT

A method of tracking the position of an object, comprising using reference interference data from first output beam, reference interference data from a second output beam, measurement interference data from the first output beam, measurement interference data from the second output beam, and knowledge of the difference between the absolute phase offset of the first output beam and the absolute phase offset of the second output beam for both a reference interferometer (15') and a measurement interferometer (15) to calculate a parameter indicative of the absolute phase offset of the measurement interferometer (15) for the first output beam. The calculated parameter is used to calculate the ratio of the optical path differences of the measurement interferometer (15) and the reference interferometer (15').

18 Claims, 7 Drawing Sheets

(56) References Cited

U.S. PATENT DOCUMENTS

| | | | |
|---|---|---|---|
| 5,631,736 A * | 5/1997 | Thiel et al. | 356/486 |
| 5,781,295 A | 7/1998 | Fuchs et al. | |
| 5,784,161 A | 7/1998 | Bechstein et al. | |
| 7,292,347 B2 * | 11/2007 | Tobiason et al. | 356/498 |
| 2006/0062260 A1 | 3/2006 | Marron et al. | |
| 2006/0182383 A1 | 8/2006 | Slotwinski | |
| 2006/0290917 A1 | 12/2006 | Soreide et al. | |

FOREIGN PATENT DOCUMENTS

| | | | |
|---|---|---|---|
| JP | 2005283520 A | * | 10/2005 |
| WO | 2005001445 | | 1/2005 |

OTHER PUBLICATIONS

Barwood et al., "High-accuracy length metrology using multiple-stage swept-frequency interferometry with laser diodes", "Meas. Sci. Technol. 9", Feb. 27, 1998, pp. 1036-1041, Publisher: National Physical Laboratory, Published in: GB.

Bechstein et al., "Absolute interferometric distance measurements applying a variable synthetic wavelength", "J. Opt. 29", 1998, pp. 179-182, Publisher: IOP Publishing Ltd., Published in: GB.

Coe et al., "Frequency scanning interferometry in ATLAS: remote, multiple, simultaneous and precise distance measurements in a hostile environment", "Measurement Science and Technology 15", Sep. 30, 2004, pp. 2175-2187, Publisher: Institute of Physics Publishing, Published in: GB.

Fox-Murphy et al., "Frequency scanned interferometry (FSI): the basis of a survey system for ATLAS using fast automated remote interferometry", "Nuclear Instruments and Methods in Physics Research A", 1996, pp. 229-237, Publisher: Elsevier Science B.V.

Kinder et al., "Progress in Absolute Distance Interferometry Based on a Variable Synthetic Wavelength", "Photonics in measurement, 2nd International Symposium", 2004, pp. 1-8.

Swinkels et al., "Correcting movement errors in frequency-sweeping interferometry", "Optics Letters", Sep. 1, 2005, pp. 2242-2244, vol. 30, No. 17, Publisher: Optical Society of America.

Yang et al., "High-precision absolute distance and vibration measurement with frequency scanned interferometry", "Applied Optics", Jul. 1, 2005, pp. 3937-3944, vol. 44, No. 19.

Zheng, "Optical frequency-modulated continuous-wave interferometers", "Applied Optics", Apr. 30, 2006, pp. 2723-2730, vol. 45, No. 12.

European Patent Office, "International Search Report", "from PCT Appplication No. PCT/GB2011/051399", Oct. 5, 2011, pp. 1-11, Published in: EP.

\* cited by examiner

APPARATUS AND METHOD FOR MEASURING DISTANCE

This application claims the priority under 35 U.S.C. 371 of prior PCT application PCT/GB2011/051399, filed Jul. 22, 2011, which in turn claims the priority of prior Great Britain patent application no. 1013896.4, filed Aug. 19, 2010, all of which are incorporated herein in their entirety by reference.

FIELD OF THE INVENTION

The present invention concerns an apparatus and method for measuring distance. More particularly, the invention is in the field of interferometric measurement of distance.

BACKGROUND TO THE INVENTION

An interferometer is a well-known instrument for measuring properties of light or other waves. In its simplest form, an interferometer comprises a source of at least partially coherent waves, a splitter/combiner for splitting the waves into two portions and subsequently recombining them, two "arms" that the two split portions of waves propagate along and back prior to recombination, and a detector for detecting variations in the intensity of the recombined waves. Many variations exist, however; for example the splitting and combining may be carried out by separate elements, the arms may include waveguides or simply involve free-space propagation to a reflector of some kind, and there may in some cases be more than two arms. The significant property of an interferometer is that the intensity of the detected light waves with changes in the relative lengths of the arms, due to interference between the portions of waves that have propagated along each arm.

As is well-known, waves will interfere constructively (the instantaneous amplitudes will reinforce each other) when two or more identical waves are superimposed on each other in phase (such that peaks and troughs in each wave line up with each other), and will interfere destructively (the instantaneous amplitudes will cancel each other out) when such waves are superimposed on each other in anti-phase (such that peaks and troughs in one wave line up with troughs and peaks, respectively, in another wave). Phase differences that fall between fully in-phase and fully anti-phase interference result in reduced amounts of constructive or destructive interference, relative to those extreme cases. In an interferometer, as the length of an arm is increased, the wave that has traversed that arm will move in and out of phase with respect to an identical wave that has traversed an arm of fixed length. Therefore, the degree of constructive and destructive interference between the waves will vary cyclically and so therefore will the intensity detected at the detector. Thus the intensity at the detector is an indication of the relative lengths of the arms.

Several different methods of measuring distance using an interferometer are known. In the simplest, differential interferometry, the phase of a wave that has passed down a first arm, of known length, and the phase of a wave that has passed down a second arm, of unknown length, are compared in the manner described above. As explained above, the intensity detected at the detector will be between a maximum (full constructive interference, when the wave from each arm is in phase) and a minimum (full destructive interference, when the wave from each arm is in anti-phase). The change in path length required to move from the maximum to the minimum is half a wavelength (which would be, for example, a few tenths of a micron for visible light), and so this technique allows an unknown length change of the arm to be determined very precisely. However, because the intensity varies cyclically, the absolute length of the unknown arm is not determined: the intensity is the same for every whole wavelength of length difference, so only the remaining non-integer portion of the difference is determined.

In differential interferometry, the frequency of the wave must be fixed. In contrast, an alternative approach known as frequency-scanning interferometry (FSI) uses a source of waves having a frequency that can be varied (for an introduction to FSI, see Zheng J. "Optical frequency-modulated continuous-wave interferometers", Applied Optics, 2006, 45, pp 2723-2730). In most FSI schemes, the waves are fed simultaneously into two interferometers: a reference interferometer having arms of known length and another, measurement, interferometer including a measurement arm, of unknown length that is to be determined. Providing the lengths of all arms remain constant, when the frequency of the waves is varied, the resulting change in the phase of the detected intensity in each interferometer is proportional to the optical path difference between the arms of that interferometer; equivalently, the ratio of optical path differences between the interferometers is equal to the ratio of the change in the phases in the detected signal. So if tuning over a fixed frequency interval results in the detected intensity in the reference interferometer passing through, say, 3 intensity maxima, and in the measurement interferometer, say, 6 intensity maxima, then the path difference between the arms of the measurement interferometer is twice as large as that between the arms of the reference interferometer. If the lengths of all interferometer arms except the measurement arm are known, the unknown length is determined.

FSI has the advantage that, in principle, the absolute order number of the interference fringes does not have to be determined, as measurement of the changes in the fringes with changing frequency is sufficient.

Regrettably, FSI tends to be less accurate and precise than the simple method of interferometry described above, particularly for long unknown distances. There are two main reasons for this. Firstly, most FSI systems measure length relative to the optical path difference of a 'reference' interferometer, whereas the simple method of interferometry described above measures length relative to a fixed laser wavelength. Limits in the accuracy of our knowledge of lengths of the reference interferometer optical path difference, or the fixed laser wavelength will degrade the accuracy of the final measurement. Typically it is easier to construct a laser with an accurately known fixed wavelength than it is to construct a useful reference interferometer with a length that is accurately known. Therefore FSI measurements are typically less accurate than measurements with the simple method of interferometry described earlier. Secondly, the nature of an FSI measurement is such that it is more sensitive to errors in determining the phase of the interferometers than differential interferometry is. i.e. a given error in phase measurement will lead to a larger error in distance measurement in FSI than in differential interferometry.

FSI also suffers from an error commonly known as 'drift error' whereby if the measured length changes during a measurement, this creates an error in the distance measurement that is typically much larger than the drift itself, being magnified by the ratio of the scan average frequency to the change in frequency over the scan.

Drift can often be limited at least to some extent by controlling the environment of the interferometers. Where that is not possible or not sufficient, various other methods of ameliorating the effects of drift exist. For example, Kinder T and Salewski K. "Progress in absolute distance interferometry based on a variable synthetic wavelength". Messtechnik. (1)

describe an FSI system utilising superheterodyne interferometry, in which the FSI phase measurements are made at beat frequencies generated between a first, fixed-frequency, laser and a second, tunable, laser. In this case, the change of beat frequency over the scan is twice the scan average frequency, and so the magnification of the drift is 0.5 (i.e. the error in the measurement of the unknown length is smaller than the relative interferometer drift). However, the Kinder system suffered from slow recording of multiple measurements, and an improved system was developed by Bechstein K and Fuchs W, "Absolute interferometric distance measurements applying a variable synthetic wavelength", Journal of Optics. 1998; 29:179. This system utilised specialised optics, based on a Kösters prism, to generate four phase quadrature signals (one for each of two orthogonally polarised waves from two tunable lasers). Use of the quadrature signals enabled simultaneous measurement of the interferometer phase for each laser. The lasers were tuned in opposite directions, to reduce the effects of interferometer drift.

FSI has also been carried out without using a reference interferometer. Barwood G, Gill P and Rowley W describe in "High-accuracy length metrology using multiple-stage swept-frequency interferometry with laser diodes", Measurement Science and Technology, 1998, 9(7), pp 1036-1041 an FSI-like technique in which, rather than using a reference interferometer, uses the beat frequencies between, on the one hand, a laser locked successively to two different spectral absorption features of rubidium and, on the other hand, a laser scanned in frequency between start and end points that are locked to etalon peaks. Barwood's method builds up accuracy by using sequentially larger frequency sweep ranges.

Another approach to FSI, using fast, coarse tuning and fine-tuned subscans, was implemented by Fox-Murphy A, Howell D, Nickerson R, and Weidberg A "Frequency scanned interferometry (FSI): the basis of a survey system for ATLAS using fast automated remote interferometry", Nuclear Instruments and Methods in Physics, 1996; 383(1):229-237. Another, using linked subscans, has been implemented by Coe P A, Howell D F and Nickerson R B, "Frequency scanning interferometry in ATLAS: remote, multiple, simultaneous and precise distance measurements in a hostile environment" Measurement Science and Technology 2004; 15(11):2175-2187.

Coe Pa, Howell D F, Nickerson R B in "Frequency scanning interferometry in ATLAS: remote, multiple, simultaneous and precise distance measurements in a hostile environment", Measurement Science and Technology, 2004; 15(11):2175-2187 describe a technique that simultaneously makes two FSI distance measurements of a distance, using a pair of tunable lasers. By varying the frequencies of each of these lasers in opposite directions, the error that occurs due to a change of distance during the measurement is also opposite for each of the two measurements. Therefore by averaging these two measurements the error is cancelled out.

Swinkels B, Bhattacharya N, Braat J in "Correcting movement errors in frequency-sweeping interferometry.", Optics Letters. 2005; 30(17):2242-2244 describe a way in which the error from a changing distance during an FSI measurement may be reduced. It takes FSI measurements with the laser frequency alternately increasing and decreasing. By using a weighted average of several consecutive measurements the effect of distance change during measurement may be reduced. This method takes several sweeps for a single distance measurement and cannot compensate well for distance changes that occur on timescales shorter than the time taken for a frequency sweep.

Yang H, Deibel J, Nyberg S, Riles K in "High-precision absolute distance and vibration measurement with frequency scanned interferometry", Applied Optics. 2005; 44(19):3937-44 describe a system that measures vibration as well as absolute distance using a tunable laser, FSI-like measurement.

But, prior-art FSI systems cannot cope well with a changing optical path difference (OPD). The explanation for that starts with this equation relating phase $\phi$ to interferometer OPD, D, and laser frequency, $\nu$:

$$\phi = 2\pi \frac{D\nu}{c} \tag{1}$$

where c is the speed of light. An FSI distance measurement is essentially a measurement of the partial derivative of phase, $\phi$, with respect to frequency, $\nu$:

$$D = \frac{c}{2\pi} \frac{\partial \phi}{\partial \nu} \tag{2}$$

However, in practice, FSI systems do not measure the partial derivative. The interferometer's phase, $\phi$, is affected by changes in distance, D, as well as frequency, $\nu$. Therefore we must consider the total derivative as the measurable quantity:

$$\frac{d\phi}{d\nu} = \frac{2\pi}{c}\left(D + \nu \frac{dD}{d\nu}\right) \tag{3}$$

We can measure $d\phi/d\nu$ and $\nu$. The FSI measurement itself is supposed to determine D. However there is another, unknown, parameter in this equation: $dD/d\nu$. That means that prior-art FSI systems cannot simultaneously precisely determine both the absolute distance, D, and the rate of change of distance with respect to laser frequency, $dD/d\nu$.

It is however possible to obtain some knowledge of $dD/d\nu$. A common way of obtaining this is to minimise dD by holding the measured distance stationary during the measurement, whilst simultaneously maximising d$\nu$ by using a laser that sweeps its frequency as fast as possible. One can then make the approximation that $dD/d\nu=0$. That approximation leads to uncertainty in the measurement of D, however, which is often the dominant contribution to the overall distance measurement uncertainty in prior-art FSI systems.

Thus a drawback of current FSI measurement methods is that, if the distance measured changes (perhaps due to vibration) whilst the measurement is being made, that creates measurement errors many times larger than the scale of the movement itself. A common method of minimising the problem is to use tunable lasers with a large tuning range and/or rapid tuning rate (which reduces the magnification of the errors).

It would be advantageous to provide a method and apparatus in which the above-mentioned problems are eliminated or ameliorated.

SUMMARY OF THE INVENTION

The invention provides a method of measuring distance along the line of a laser beam. Example embodiments provide a snapshot of the measured distance and any changes to it that occur during a measurement period.

Specifically, the present invention provides, according to a first aspect, a method of tracking the position of an object, the method comprising:

varying during a measurement period an optical frequency of at least one of (i) a first laser, providing a first output beam, and (ii) a second laser, providing a second output beam;

simultaneously directing the first and second output beams into both (a) a reference interferometer having arms with a known optical path difference and (b) a measurement interferometer having arms with an unknown optical path difference, the unknown optical path difference giving rise for each output beam to an interferometer phase difference for the first output beam and an interferometric phase difference for the second output beam, each interferometric phase difference consisting of an absolute phase offset and an unwrapped phase;

obtaining, in the measurement period, reference interference data from the reference interferometer and measurement interference data from the measurement interferometer;

distinguishing, on the one hand, interference data resulting from the first output beam from, on the other hand, interference data resulting from the second output beam, in both the reference interference data and the measurement interference data;

determining for both the reference interferometer and the measurement interferometer the difference between the absolute phase offset of the first output beam and the absolute phase offset of the second output beam;

using the reference interference data from the first output beam, the reference interference data from the second output beam, the measurement interference data from the first output beam, the measurement interference data from the second output beam, and knowledge of the difference between the absolute phase offset of the first output beam and the absolute phase offset of the second output beam for both the reference interferometer and the measurement interferometer to calculate a parameter indicative of the absolute phase offset of the measurement interferometer for the first output beam; and using the calculated parameter to calculate the ratio of the optical path differences of the measurement interferometer and the reference interferometer.

It may be that the calculated parameter is used to calculate the ratio of the optical path differences of the measurement interferometer and the reference interferometer for a plurality of times within the measurement period.

As discussed above, in practice, the measurements made in FSI systems can be described by Equation (3):

$$\frac{d\phi}{dv} = \frac{2\pi}{c}\left(D + v\frac{dD}{dv}\right)$$

where dD/dv is an unknown parameter that cannot be measured precisely using prior-art systems.

The invention provides a way to improve our knowledge of dD/dv, by measuring the parameter, rather than relying on an estimate. That is done using a second laser, with instantaneous frequency μ. By measuring the interferometer phase from both of the lasers independently and simultaneously, we can write two equations in place of the single equation we had previously:

$$\frac{d\phi}{dv} = \frac{2\pi}{c}\left(D + v\frac{dD}{dv}\right) \qquad (4)$$

$$\frac{d\phi}{d\mu} = \frac{2\pi}{c}\left(D + \mu\frac{dD}{d\mu}\right)$$

Provided that the two lasers are scanning differently from each other (dϕ/dv≠dθ/dμ), we now have enough information to solve for both unknowns. This means that we no longer need to try to hold the distance, D, constant during the measurement, nor do we need to use a large frequency scan speed as there is no need to try to minimise the error on an estimate that dD/dv=0.

The invention thus helps to minimise or track the error that results from a change in the length of an arm during a distance measurement. That enables measurements to be made to a higher precision or, alternatively, it reduces the technical requirements of the laser used (it can have a slower scan rate and/or a smaller scan than in prior-art techniques). As discussed above, common prior-art method of minimising the problem of a changing distance during the measurement is to use tunable lasers with a rapid tuning rate (this reduces the magnification of the errors). Embodiments of the method according to the invention do not suffer from that problem, and so there is the option to use slowly tuned lasers (for example, thermally tuned DFB lasers).

The invention also provides a high measurement rate, because movement is measured continuously during each scan, and because it can cope with smaller scans without 'movement error' problems.

The optical frequencies of the first and second lasers may be varied at different rates, i.e. the first and second lasers may be tuned at different rates. It may be that the optical frequency of one of the lasers is not varied; i.e. one of these rates may be zero (i.e. the laser is not tuned). The first and second lasers may be tuned in opposite directions (i.e. the first laser may be tuned from a higher frequency to a lower frequency and the second laser may be tuned from a lower frequency to a higher frequency). It may be that the first and second lasers are varied (i.e. tuned) over an identical range of frequencies.

The determining of the difference between the absolute phase offset of the first output beam and the absolute phase offset of the second output beam may be done by locating a zero-frequency point in a beat signal between the first output beam and the second output beam. Alternatively, the determining may be done using one or more wavelength meters.

The method may comprise using knowledge of when the first laser is tuned to the same frequency as the second laser to set a parameter indicative of the absolute phase offset of the interference signal resulting from the first beam in the measurement interferometer to be equal to a parameter indicative of the absolute phase offset of the interference signal resulting from the second beam in the measurement interferometer, thereby providing the parameter indicative of the absolute phase offset of the measurement interferometer.

The distinguishing between, on the one hand, interference data resulting from the first output beam from, on the other hand, interference data resulting from the second output beam may be done by identifying data consistent with tuning (i.e. varying the optical frequency) of the first laser and the second laser, respectively, in both the reference interference data and the measurement interference data. That may be done by distinguishing between one or more beam parameter of the first output beam and the second output beam, the beam parameter selected from, for example, the polarisation of the light in the beam, the scan rate of the light in the beam, the frequency of the light in the beam, a modulation of the light in the beam (e.g. of the frequency or the amplitude of the light), or a time division between the beams (i.e., the beams may alternate in time). The distinguishing between, on the one hand, interference data resulting from the first output beam from, on the other hand, interference data resulting from the second output beam may be done by using quadrature detection of a complex signal.

The calculation of the parameter indicative of the absolute phase offset of the measurement interferometer for the first output beam may include obtaining at least two different measurements of the phase difference of an interference signal in the reference interference data from the first output beam, the phase difference of an interference signal in the reference interference data from the second output beam, the phase difference of an interference signal in the measurement interference data from the first output beam, and the phase difference of an interference signal in the measurement interference data from the second output beam. The calculation of the parameter may include combining those phase differences with a parameter, of known value, indicative of the absolute phase offset of the reference interferometer.

Preferably, there are more than two measurements of those phase differences, and the calculation of the parameter indicative of the absolute phase offset of the measurement interferometer for the first output beam includes using the method of least squares on those measurements.

The calculation of the ratio of the optical path differences of the measurement interferometer and the reference interferometer may include using the phase difference of an interference signal in the reference interference data from the first output beam, the phase difference of an interference signal in the reference interference data from the second output beam, the phase difference of an interference signal in the measurement interference data from the first output beam, and the phase difference of an interference signal in the measurement interference data from the second output beam.

The method may be a method of, for example, precision manufacturing, machine tool calibration, or optical fibre network testing.

According to a second aspect of the invention there is also provided an interferometer array for tracking the position of an object, comprising:

a first laser for providing a first output beam;

a second laser for providing a second output beam, with at least one of the first and second lasers configured to have an optical frequency that can be controllably varied with time;

a reference interferometer having arms with a known optical path difference;

a measurement interferometer having arms with an unknown optical path difference, the unknown optical path difference giving rise to an interferometer phase difference consisting of an absolute phase offset and an unwrapped phase for the first output beam and for the second output beam;

the first and second lasers being arranged to simultaneously direct the first and second output beams into both the reference interferometer and the measurement interferometer;

and signal processing apparatus configured to:

identify for both the reference interferometer and the measurement interferometer the difference between the absolute phase offset of the first output beam and the absolute phase offset of the second output beam;

obtain reference interference data from the reference interferometer and measurement interference data from the measurement interferometer;

distinguish, on the one hand, interference data resulting from the first output beam from, on the other hand, interference data resulting from the second output beam, in both the reference interference data and the measurement interference data;

use the reference interference data from the first output beam, the reference interference data from the second output beam, the measurement interference data from the first output beam, the measurement interference data from the second output beam, and knowledge of the difference between the absolute phase offset of the first output beam and the absolute phase offset of the second output beam for both the reference interferometer and the measurement interferometer to calculate a parameter indicative of the absolute phase offset of the measurement interferometer for the first output beam; and use the calculated parameter to calculate the ratio of the optical path differences of the measurement interferometer and the reference interferometer.

The signal processing apparatus may include an analogue-to-digital converter. The signal processing apparatus may include a microprocessor programmed to carry out signal processing steps of the method.

The interferometer array may include a photodetector, for example a photodiode, arranged to detect a zero-frequency point in a beat signal between the first output beam and the second output beam. The interferometer array may include one or more wavelength meter and signal processing apparatus arranged to determine the difference in absolute phase offset between the first output beam and the second output beam.

It may be that at least one arm of at least one of the interferometers is formed in substantially free space, in a bulk dielectric material (e.g. glass) or in an optical fibre.

It may be that each arm of each interferometer is substantially free space, a bulk dielectric material (e.g. glass) or an optical fibre.

It may be that the interferometers share components. It may be that all of the components of the interferometers are shared except for a reflector at the end of an arm of each interferometer. Thus, it may be that the path differences of the arms of each interferometer are provided a plurality of reflectors at different locations.

In embodiments of the invention, time-resolved distance measurements are made to multiple targets from a single point, preferably to sub-micron precision. For example, the waves from the first and second lasers may be in a beam that is split to form a plurality of angularly separated beams, with the plurality of reflectors each located to receive a different one of the beams. The beam may be split, for example, by mirrors, a diffraction grating, or a holographic element such as a spatial light modulator. As a second example, the waves from the first and second lasers may be in a divergent beam, with parts of this divergent beam being reflected by the plurality of reflectors.

The invention provides, according to a third aspect, an instrument comprising an interferometer array according to the first aspect of the invention. The instrument may be, for example, a surveying tool (e.g. a laser tracker/scanner), an instrument for machine tool calibration, an instrument for optical frequency domain reflectometry, an instrument for optical fibre network testing, a monitoring component on a satellite for formation flying with other satellites, a monitoring component on a telescope, a monitoring component on a particle accelerator, or an optical fibre sensor.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 2 is (a) an interferometer array used in the prior-art method of frequency-scanning interferometry, and (b) the same array showing some example dimensions and results;

FIG. 4 is (a) an interferometer array according to an example embodiment of the invention, and (b) a spectrum obtained from an array of that kind;

FIG. 7 is (a) an arrangement for identifying when the two lasers of FIG. 4(a) have the same frequency, and (b) a plot of photodiode signal against time for that arrangement;

DETAILED DESCRIPTION

Figure 1:
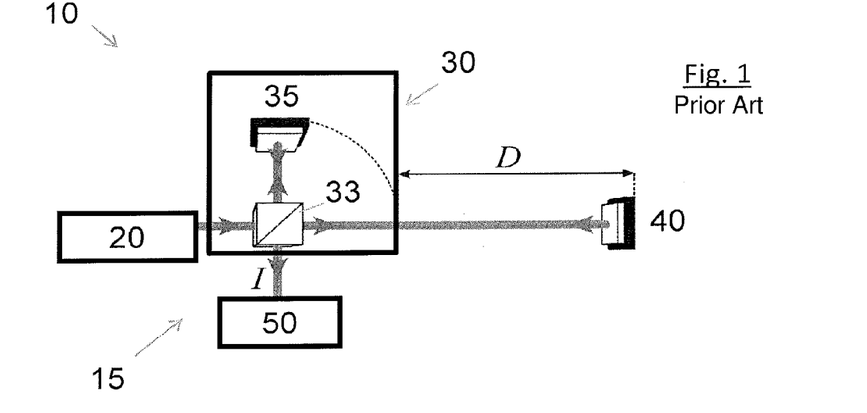
FIG. 1 is a standard interferometer.

An example standard, prior-art interferometer system 10 (FIG. 1) comprises a laser 20, providing light of an intensity $I_0$ and fixed wavelength $\lambda$. Light from the laser passes into an interferometer 15. The interferometer 15 includes an interferometer head 30. In accordance with the description given above, within the interferometer head 30 the light is split by a splitter 33, with a portion travelling a round-trip back to the splitter 33 over a known distance to a reference mirror 35. The remainder of the light travels out of the head 30, over an unknown distance to a measurement mirror 40. The light portion is reflected at mirror 40 and travels back to the splitter 33 within the head 30. The difference between the unknown distance to mirror 35 and the known distance to mirror 40 is known as the optical path difference, D. This is the distance that is to be measured. The light portion that has traveled the known distance and the light portion that has traveled to and from the mirror 40 are recombined at the splitter 33, and exit the head 30 as a combined beam, which is detected at a photodiode 50. The intensity I of light detected at the photodiode 50 is given by $$I = I_0\left(1/2 + 1/2\cos\left(2\pi\frac{2Dn}{\lambda}\right)\right) = I_0(1/2 + 1/2\cos\phi) \quad (5)$$

where n is the refractive index of the medium through which the light portion travels when travelling the distance D, and the interferometer phase $\phi$ is defined by the right-hand equation.

Figure 2:
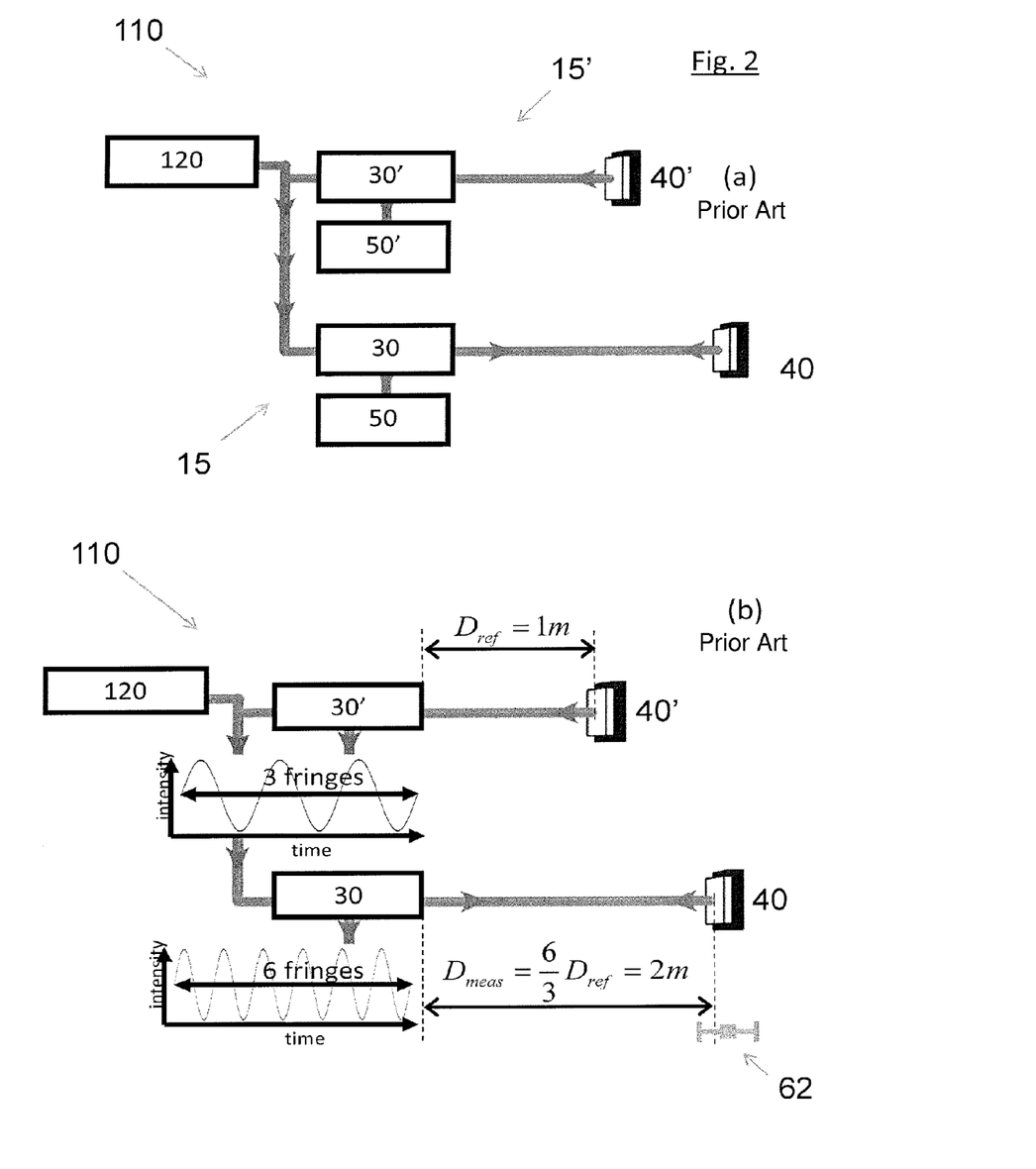

In FSI (FIG. 2), the fixed-frequency laser 20 used in differential interferometry is replaced with a variable-frequency laser 120. Also, a second, reference, interferometer 15' (comprising a head 30', mirror 40' and photodiode 50') is provided (FIG. 2(a)). The lengths of both arms of the reference interferometer 15' are known. As explained above, when the output wavelength of the laser 120 is varied, the interferometer intensity I, I' detected at each photodiode 50, 50' changes by an amount that is proportional to the optical path difference between the arms of that interferometer, so that the ratio of the changes in the phases in the detected signals is equal to the ratio of the optical path differences between the interferometers. Thus, as illustrated in FIG. 3(b), if the change in frequency produces a change in interferometer phase of 3 fringes in the reference interferometer 15 and 6 fringes in the measurement interferometer 15', we know that the distance $D_{meas}$ to the mirror 40' of the measurement interferometer 15' is twice as long as the distance $D_{ref}$ to the mirror 40 of the reference interferometer 15. However, as discussed above, to measure a long distance $D_{meas}$ requires a slower rate of change of wavelength, but that means the distance being measured can change during the course of each measurement, for example as a result of environmental fluctuations.

Figure 3:
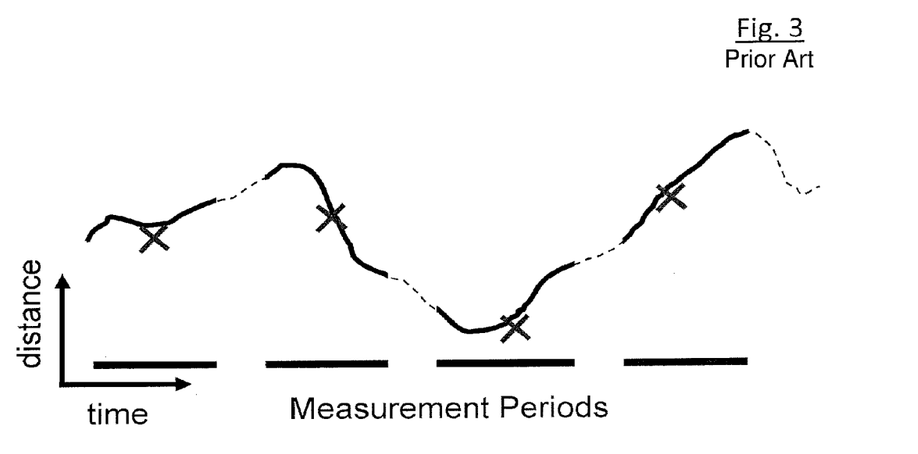
FIG. 3 is a schematic plot of the variation of target distance with time (dashed line), prior-art measurements (crosses), and measurements made according to an example embodiment of the present invention (solid line)

That problem is illustrated in the plot of FIG. 3. The actual distance to the measurement mirror 40' varies with time (dashed line); more significantly, it varies with time during each measurement period (represented by a solid bar along the time axis). Each measurement (cross) of that distance is therefore an approximation, being an average of the distance during the measurement period. Advantageously, the present invention allows tracking of the variations in the distance within each measurement period (solid line).

The discussion set out earlier considered measurements of derivatives of various quantities. In an actual measurement those derivatives are not determined directly; rather, a sequence of values in a time series is measured. Derivatives could be calculated from that sequence using finite differences, but a better solution (which uses all the data together) is to solve a collection of equations describing our knowledge of the system using a least squares solution. When that is done for single laser FSI, such as that shown in FIG. 2, the equations form an under-constrained system, as there are more unknown parameters than equations, and there is therefore no unique solution to the equations. In order to come to a unique solution we are forced to make an assumption about how the distance changed during the measurement; as with the previous discussion, a sensible choice for this is to assume that the measured distance did not change during the measurement.

For a dual-laser FSI measurement (FIG. 4), a second variable-frequency laser 120' is added to the FSI system of FIG. 3. Light from the second laser 120' is varied in frequency at a different rate from the variation in frequency of the light from the first laser 120; in this example, the lasers are tuned in opposite directions, with one tuned high frequency to low frequency and the other tuned low frequency to high frequency. Light from both variable-frequency lasers 120, 120' passes into the reference interferometer 15' and measurement interferometer 15, in coincident beams. The signal on the photodiode 50, 50' of each interferometer 15, 15' is thus a combination of the interference signals resulting from the light from each laser 120, 120'. The light from each of the two lasers 120, 120' will however be at a different frequency (except for at one particular frequency when the two frequency scans coincide), and so the interference signals resulting from each laser 120, 120' can be separated readily (FIG. 4(b)); enabling two pairs of intensity versus time signals to be obtained. The corresponding interferometer phase differences can then readily be calculated, for example using a Hilbert transform.

Figure 4:
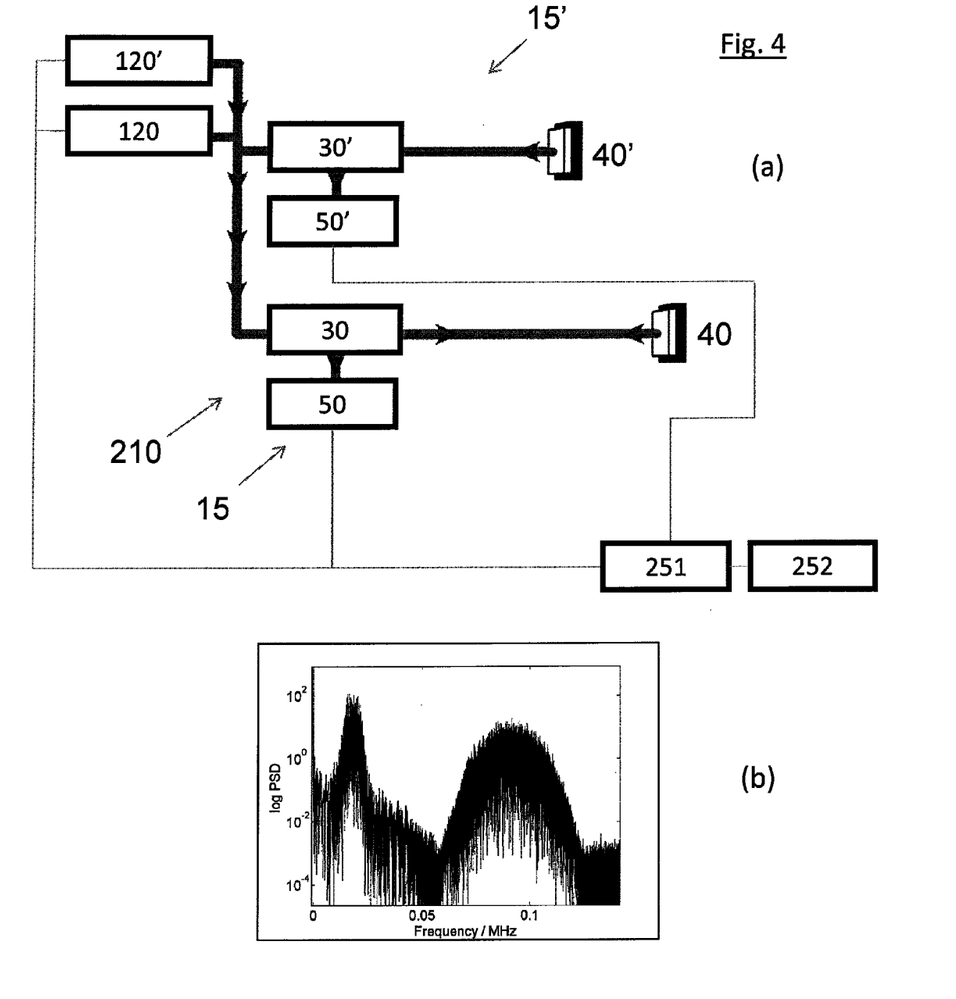

The equations describing the FIG. 4 arrangement form an over-constrained system and therefore they can be solved with least squares. In practice, however, for this least-squares problem to be solved, we require an additional piece of information about the relative frequencies of the two tunable lasers. An example analysis method for an FSI measurement made with two simultaneously scanning lasers will now be described. The example method starts from measurements of interferometer phase and from that calculates the distance ratio of the measurement and reference interferometers as a function of time throughout the measurement.

We start with an equation relating phase to distance and frequency, which is then manipulated to put it the form P+p=Dv.

The phase difference between the two paths in the interferometer is given by:

$$\Phi_i^{tot} = \frac{2\pi}{c} D_i v_i + \alpha \quad (6)$$

(The i subscripts refer to a particular sample from an analogue-digital converter connected to the relevant photodiode; there are typically several thousand such samples in an FSI measurement.)

By observing the intensity of the interference pattern the total phase, $\Phi^{tot}$, can be calculated modulo $2\pi$. The fact that it is calculated modulo $2\pi$ can be represented in this equation by splitting $\Phi_{tot}$ into two parts; one, $\Phi$, representing the measured phase modulo $2\pi$ and the other, N, representing the (unknown) integer multiple of $2\pi$ that makes up the remainder of $\Phi^{tot}$.

$$\Phi_i^{tot} = 2\pi N_i + \Phi_i \quad (7)$$

Substituting this two component phase, equation 7, into the model equation, 6, gives the following equation:

$$2\pi N_i + \Phi_i = \frac{2\pi}{c} D_i v_i + \alpha \quad (8)$$

we now have an equation describing the measured phase modulo $2\pi$, known as the wrapped phase. By looking for discontinuities in the wrapped phase, a phase-unwrapping algorithm can calculate the unwrapped phase to be:

$$\tilde{\Phi}_i = \Phi_i + N_i - N_0 \quad (9)$$

Figure 5:
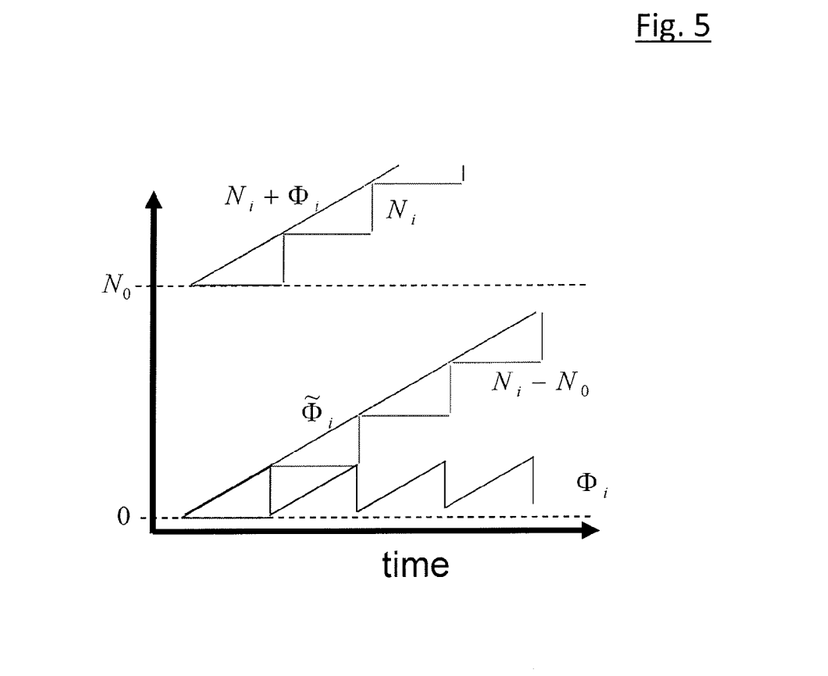
FIGS. 5 and 6 are plots against time of various phase parameters relevant to understanding the invention.

FIG. 5 illustrates that phase-unwrapping. The total phase, $\Phi^{tot}$, (upper straight line) is formed from the phase modulo $2\pi$, $\Phi_i$, which is a saw-tooth function of time, and $N_i$, the integer multiples of $2\pi$, which step up with time. By subtracting the phase $N_0$ at the beginning of the data set from the sum of those components, one obtains the unwrapped phase $\tilde{\Phi}$, (middle straight line). Substituting this into the equation for wrapped phase we get an equation for the unwrapped phase:

$$2\pi N_0 + \tilde{\Phi}_i = \frac{2\pi}{c} D_i v_i + \alpha \quad (10)$$

In the definition of the unwrapped phase above the phase has been unwrapped starting from the beginning of the data set. This choice was 'hard wired' into the definition. Doing this has unintentionally removed some flexibility from the equations, that is, the ability to choose how much of the total phase to share between $N_0$ and the $\tilde{\Phi}_i$. This flexibility will now be put back in by defining a pair of variables:

$$P = 2\pi N_0 + \beta - \alpha \quad (11)$$

$$\phi_i = \tilde{\Phi} - \beta \quad (12)$$

Figure 6:
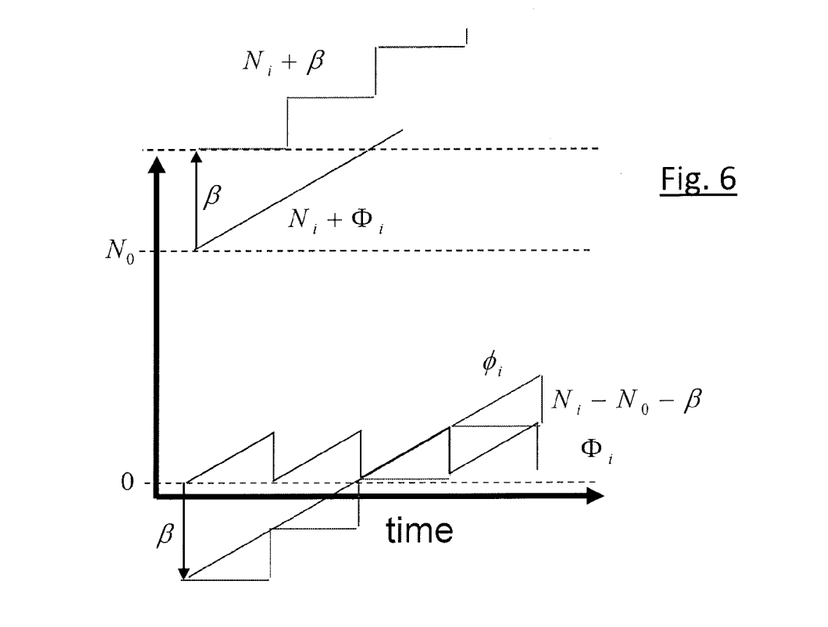

P replaces $N_0$ as the phase offset, which is shifted by an arbitrary value, $\beta$. The constant phase term $\alpha$ has also been incorporated into P simply to tidy up the final equation slightly. $\phi_i$ replaces the unwrapped phase, $\tilde{\Phi}_i$, and is simply the same set of values shifted in the opposite direction to $N_0$ by the same amount, $\beta$. FIG. 6 illustrates this change of variables. Note that introducing this extra parameter, $\beta$, is an entirely mathematical exercise. It does not represent any extra information or estimates about the state of the system. It is merely introduced as a mathematical convenience in the same way that one might change coordinate system in order to make certain problems easier to solve. Substituting these equations, we arrive at:

$$P + \phi_i = \frac{2\pi}{c} D_i v_i \quad (13)$$

This is the model equation we started with, manipulated and tidied up in order to make it easier to work with. It describes unwrapped phase from an FSI measurement as the sum of a measured set of phase values and an unknown offset P, and equates that to a constant times the product of interferometer OPD and laser frequency.

That equation describes the phase for a particular laser frequency going into a particular interferometer, which is measured by observing the intensity of an interference pattern.

We are considering a system with two interferometers and two lasers. This can be represented mathematically by writing out four copies of the tidied up model equation (equation 13), one for each combination of laser and interferometer. Thus, we have:

|  | 1st laser 120 | 2nd laser 120' |
| --- | --- | --- |
| Measurement interferometer 15 | $P + \phi_i = D_i v_i$ | $Q + \theta_i = D_i \mu_i$ |
| Reference interferometer 15' | $\bar{P} + \bar{\phi}_i = \bar{D}_i v_i$ | $\bar{Q} + \bar{\theta}_i = \bar{D}_i \mu_i$ | for the two laser, two interferometer system of FIG. 4. Here, $\theta$ is the unwrapped phase from the second laser, $\mu$ is the frequency of the second laser and Q is the unknown phase offset for the second laser. Although it is not in the table, we also need to introduce another parameter, $\gamma$, which is equivalent to the parameter $\beta$ from the first laser. Where they do not have a bar above them, all these quantities refer to the measurement interferometer. Where we write a bar above them (e.g. $\bar{P}$), these quantities refer to the reference interferometer.

The equations in the table show what we know from measuring interferometer phases. The next step is to solve that set of equations using least squares to calculate distances, $D_i$. First, though, we need an extra piece of information. We need to know the differences (P−Q) and ($\bar{P}-\bar{Q}$). Once we know these, we may choose values for $\beta$, $\gamma$, $\bar{\beta}$ and $\bar{\gamma}$ in order to set P=Q and $\bar{P}=\bar{Q}$. After doing that, the equations may be solved.

Figure 7:
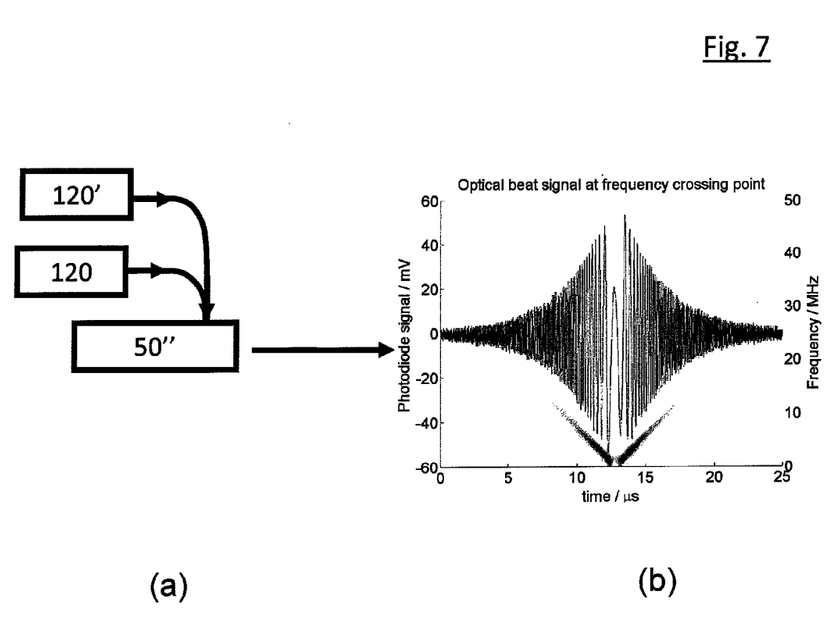

One method of determining the differences (P−Q) and ($\bar{P}-\bar{Q}$) is to find the time at which $v=\mu$ by detecting an optical beat signal between the two lasers. A small portion of the light from each laser 120, 120' is diverted to a third photodiode 50" (FIG. 7(a)). The resulting beat signal between the two laser frequencies is plotted in FIG. 7(b). The frequency of this beat signal is equal to the frequency difference of the lasers and is detectable when this beat frequency is less than the bandwidth of the photodiode. Hence by detecting the point when this beat signal has zero frequency, we may determine when the two lasers have the same frequency and hence when $v=_p$. This point is at the centre of the plot in FIG. 7(b). This allows us to identify a sampling index, i=b, where $v=\mu$, and hence we may write $v_b=\mu_b$. If we do not happen to sample data at exactly the time when $v=\mu$, we may generate an extra data sample by interpolating the data to estimate their value at the exact time when $v=\mu$.

Once we have identified this sample index, i=b, we may write the following expression:

$$a = (P+\phi_b) - (Q+\theta_b) \quad (15)$$

Where P and $\phi_b$ are the unknown phase offset and measured unwrapped phases from the first laser at a sample index, b. Q and $\phi_b$ are the same pair of quantities, describing phase in the same interferometer, but from the second laser. The parameter, a, would be zero with error free data, but in the presence of errors may be non zero.

Because the phase measurements from each laser are unwrapped we only need one measurement of this type, as once we know the absolute phase difference for one sampling index we can calculate it for all sampling indices. Additional measurements could be used as a check that the first was correct, but would not provide any more information.

A very important point to note is that we can make the error on P–Q discretised. We start by substituting in the definitions of P, $\phi$ etc, effectively going back along the chain of modifications to the original model equation that were made in the above discussion:

$$a = (P+\phi_b) - (Q-\theta_b)$$

$$a = (2\pi N_0 - \beta - \alpha + \tilde{\Phi}_b + \beta) - (2\pi M_0 - \gamma - \alpha + \tilde{\Theta}_b + \gamma)$$

$$a = (2\pi(N_0+\tilde{\Phi}_b)) - (2\pi M_0+\tilde{\Theta}_b)$$

$$a = 2\pi(N_0-M_0) + (\tilde{\Phi}_b - \tilde{\Theta}_b) \quad (16)$$

(Earlier, the parameter $\beta$ was introduced. This was specific to a particular combination of laser and interferometer. So we now introduce an equivalent parameter, $\delta$ for the second laser.)

From this final equation we can calculate an estimate of $N_b-M_b$, as follows:

$$N_b - M_b = \frac{a - (\tilde{\Phi}_b - \tilde{\Theta}_b)}{2\pi} \quad (17)$$

We know that this quantity should be an exact integer value, but measurement errors on $\tilde{\Phi}_b$ and $\tilde{\Theta}_b$ will mean that we will not calculate an exact integer value.

As mentioned previously, we incorporate this error with the parameter, a, which should ideally be zero for error free data. As long as the uncertainty on our estimate of $N_b-M_b$ is significantly less than ½, we can round the estimate to the nearest integer and reliably obtain an error free measurement of $N_b-M_b$. Here we are exploiting the fact that $N_b$ and $M_b$ are integer quantities in order to make the P–Q measurement without error.

As we have, with high probability, a zero error on the $N_b-M_b$ measurement we can incorporate this measurement into our equations by choosing values of $\beta$ and $\gamma$ such that P=Q. Then we can rewrite Q as P in all equations. (This treatment makes it impossible to perform propagation of errors on the subsequent equations as there is no way of representing an error on the P–Q measurement, but that is not a problem, because the error is discretised.) Substituting the definitions of P and Q into P=Q gives us:

$$N_0+\beta = M_0+\gamma \quad (18)$$

rearranging, $$\gamma-\beta = N_0-M_0 \quad (19)$$

So setting the difference between $\beta$ and $\gamma$ to be equal to the integer value $N_0-M_0$ enables Q to be rewritten as P in our equations, and in doing so the P-Q measurement is represented without introducing any more equations to deal with. (Note that the sum of $\beta$ and $\gamma$ can be freely set to any value.)

The above process is then repeated for data from the reference interferometer, so that we may choose values of $\overline{\beta}$ and $\overline{\gamma}$ in order to set $\overline{P}=\overline{Q}$. We may thereafter write $\overline{Q}$ as $\overline{P}$ in our equations.

We now combine the equations to calculate distance ratios using the measured unwrapped phases and the P–Q and $\overline{P}-\overline{Q}$ measurements. The equations now become:

|  | 1st laser 120 | 2nd laser 120' |
| --- | --- | --- |
| Measurement interferometer 15 | $P + \phi_i = D_i v_i$ | $P + \theta_i = D_i \mu_i$ |
| Reference interferometer 15' | $\overline{P} + \overline{\phi}_i = \overline{D}_i v_i$ | $\overline{P} + \overline{\theta}_i = \overline{D}_i \mu_i$ |

These four equations can be combined to form a single equation:

$$\frac{P+\phi_i}{\overline{P}+\overline{\phi}_i} = \frac{P+\theta_i}{\overline{P}+\overline{\theta}_i} \quad (20)$$

If the absolute phase offset of the reference interferometer, $\overline{P}$, is known then there remains a single unknown in this equation which is P. P may therefore be determined by solving this equation for P. An FSI measurement usually consists of many samples, in which case P may alternatively be determined with linear least squares.

With the value of P calculated, we can then use one of the following equations:

$$\frac{P+\phi_i}{\overline{P}+\overline{\phi}_i} = \frac{D_i}{\overline{D}_i} \quad (21)$$

$$\frac{P+\theta_i}{\overline{P}+\overline{\theta}_i} = \frac{D_i}{\overline{D}_i}$$

to determine the ratio of OPDs in the measurement and reference interferometers.

In the example embodiment of FIG. 4, those calculations are carried out in signal processing apparatus in the form of an analogue-digital converter (ADC) 251 and a microprocessor unit (MPU) 252. The ADC 251 passes data representing the output of the photodiodes 50, 50' to the MPU 252.

The method thus involves combining phases measured in an FSI scan in a global fit to the data in order to determine the absolute distance for all sampled data points. Specifically, the method involves determining the absolute distance for some particular data point, and then displacements from that distance for all the other data points in the measurement. In this way, the measurement takes a 'snapshot' of the distance for the duration of the measurement. The new method takes the same time as an FSI measurement (up to a second) to make.

Successive snapshots can be overlapped in time, so that displacement can be continuously monitored with this system, with an updated absolute distance measurement being made periodically, for example every second or so (this time period could of course be chosen differently, depending upon the specifications required).

Figure 8:
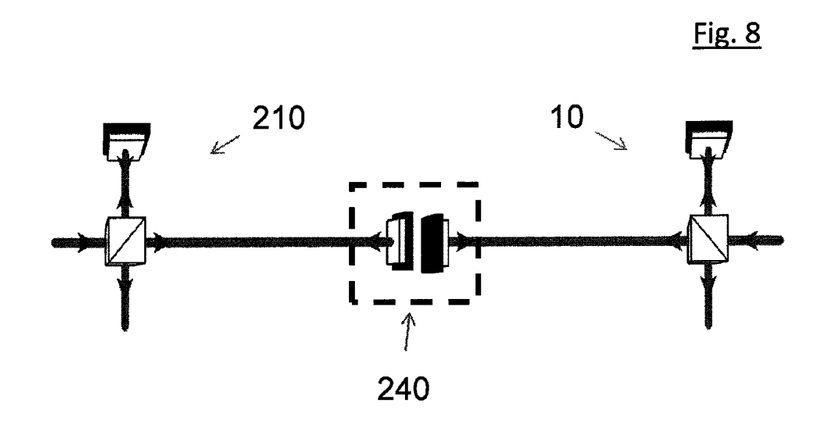
FIG. 8 is an experimental arrangement used to demonstrate an example embodiment of the invention in prototype form.
Figure 9:
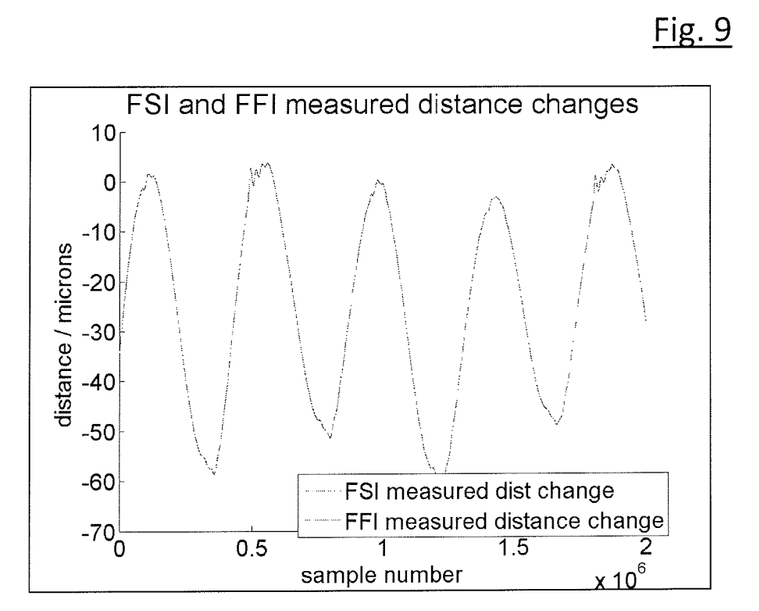
FIGS. 9 and 10 are results from the arrangement of FIG. 8
Figure 10:
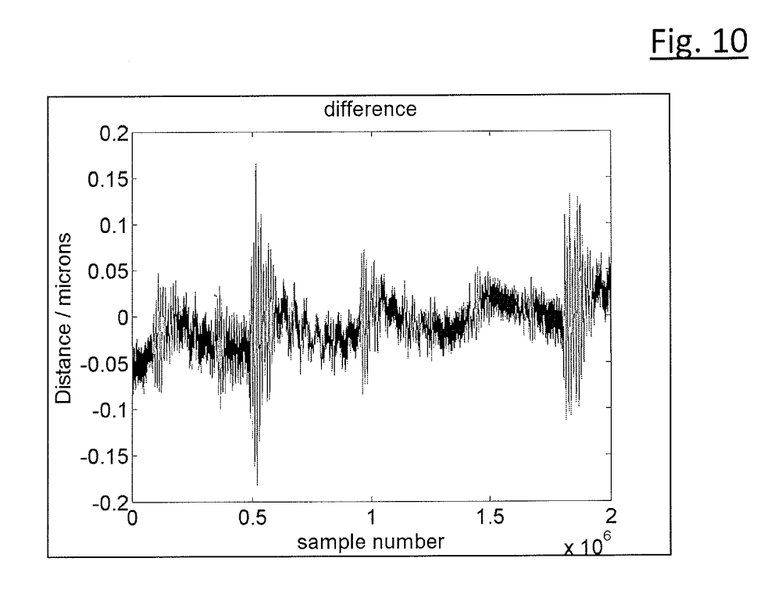

The inventors have constructed an experimental prototype according to an example embodiment of the invention (FIG. 8). The results obtained are shown in FIGS. 9 and 10. The results from an interferometric system 210 according to an example embodiment of the invention were compared with results from a standard, fixed-frequency, differential interferometry system 10. Displacements of a moveable mirror 240, mounted on a displacement stage, were measured with the dynamic FSI system 210 and with the fixed-frequency system 10. The two interferometers 10, 210 were set up to measure the displacement of the same stage 240, looking at it from opposite directions. The purpose of the investigation was to verify that the dynamic FSI measurements correctly reconstructed the motion of the mirror 240 during a measurement. A dynamic FSI measurement and an FFI measurement of the stage's motion were performed simultaneously, with the stage moved back and forth several times during the measurement.

FIG. 9 shows the results of the measurement. The curves of data from the dynamic FSI measurement and from the FFI measurement were in very close agreement, being almost indistinguishable in FIG. 9. FIG. 10 shows the difference between the two curves, which shows agreement to about 0.2 microns over a range of motion of 60 microns. This should be taken as an upper limit on the distance error present in the dynamic FSI system as this comparison was limited by the fact that interferometer 210 was too susceptible to vibrations caused by the movement of stage 240 and hence some of the 0.2 microns of disagreement may be caused by real differences in the distances to be measured, rather than measurement errors.

The curves demonstrate the dynamic FSI system works as intended, and can correctly reconstruct a complex movement during a measurement.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Figure 11:
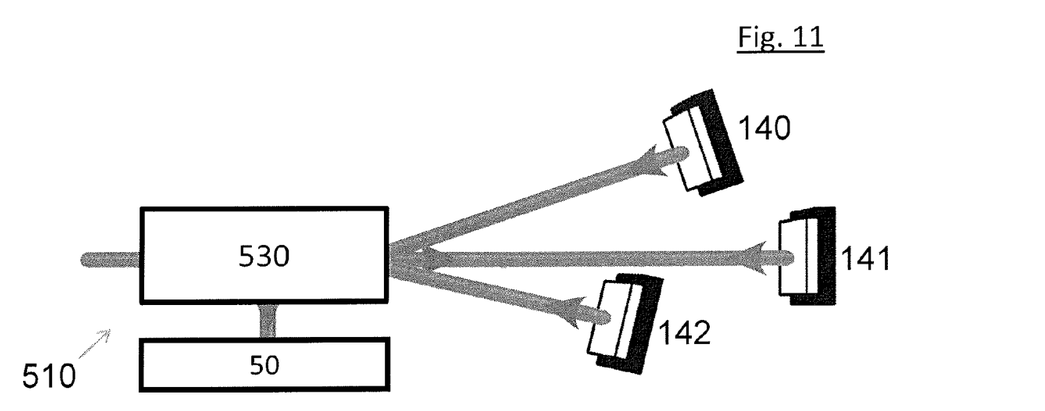
FIG. 11 is an interferometer array according to a further example embodiment of the invention.

In an alternative interferometer system 510 that is also an example embodiment of the invention (FIG. 11), multiple interferometers are formed using a common interferometer head 530 and photodiode 50. Within the head 530, the light from both lasers is directed towards each of three reflectors 140, 141, 142. In this example, the reflectors are corner cube retroreflectors, and the light is directed in beams toward each reflector (in an example alternative embodiment, a single divergent beam is sent out from interferometer head 530 such that each reflector returns a portion of this beam). Each reflector 140, 141, 142 is positioned a different distance from the splitter in the head 530, and so can be treated as a forming, with the head, three different interferometers. The position of each mirror 140, 141, 142 may thus be tracked independently.

Figure 12:
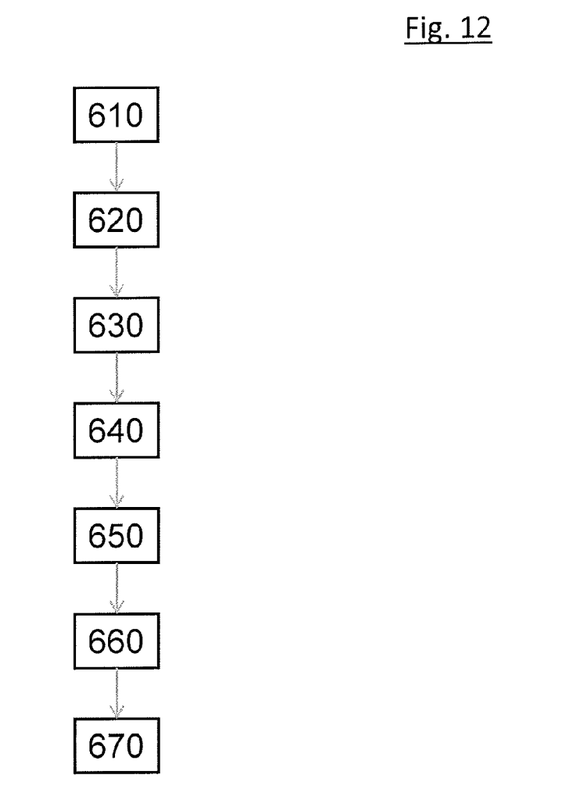
FIG. 12 is a flow chart showing steps of a method according to an example embodiment of the invention.

A method of an example embodiment of the invention is described by the flow-chart of FIG. 12. The steps of this example method are as follows:

Step 610: Separate the signals from the two tunable lasers in each interferometer.

Step 620: Determine wrapped phases for each combination of laser and interferometer.

Step 630: Perform an unwrapping algorithm on all the sets of wrapped phases.

Step 640: Determine P-Q by, for example, detecting the zero frequency point in a beat signal between the two lasers.

Step 650: Set $(\beta-\gamma)$ such that P=Q.

Step 660: Calculate P using least squares solution of the following equation:

$$\frac{P+\phi_i}{\overline{P}+\overline{\phi}_i} = \frac{P+\theta_i}{\overline{P}+\overline{\theta}_i}$$

Step 670: Calculate distance ratios using either of the following equations $$\frac{P+\theta_i}{\overline{P}+\overline{\theta}_i} = \frac{D_i}{\overline{D}_i}$$

$$\frac{P+\phi_i}{\overline{P}+\overline{\phi}_i} = \frac{D_i}{\overline{D}_i}$$

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of tracking the position of an object, the method comprising:

varying during a measurement period an optical frequency of at least one of (i) a first laser, providing a first output beam, and (ii) a second laser, providing a second output beam;

simultaneously directing the first and second output beams into both (a) a reference interferometer having arms with a known optical path difference and (b) a measurement interferometer having arms with an unknown optical path difference, the unknown optical path difference giving rise to an interferometric phase difference for the first output beam and an interferometric phase difference for the second output beam, each interferometric phase difference consisting of an absolute phase offset and an unwrapped phase;

obtaining, in the measurement period, reference interference data from the reference interferometer and measurement interference data from the measurement interferometer;

distinguishing, on the one hand, interference data resulting from the first output beam from, on the other hand, interference data resulting from the second output beam, in both the reference interference data and the measurement interference data;

determining for both the reference interferometer and the measurement interferometer the difference between the absolute phase offset of the first output beam and the absolute phase offset of the second output beam;

using the reference interference data from the first output beam, the reference interference data from the second output beam, the measurement interference data from the first output beam, the measurement interference data from the second output beam, and knowledge of the difference between the absolute phase offset of the first output beam and the absolute phase offset of the second output beam for both the reference interferometer and the measurement interferometer to calculate a parameter indicative of the absolute phase offset of the measurement interferometer for the first output beam; and using the calculated parameter to calculate the ratio of the optical path differences of the measurement interferometer and the reference interferometer.

2. A method as claimed in claim 1, in which the calculated parameter is used to calculate the ratio of the optical path differences of the measurement interferometer and the reference interferometer for a plurality of times within the measurement period.

3. A method as claimed in claim 1, in which the optical frequencies of the first and second lasers are varied at different rates.

4. A method as claimed in claim 1, in which the optical frequency of one of the lasers is not varied.

5. A method as claimed in claim 1, in which the first and second lasers are varied over an identical range of frequencies.

6. A method as claimed in claim 1, in which the determining of the difference between the absolute phase offset of the first output beam and the absolute phase offset of the second output beam is done by locating a zero frequency point in a beat signal between the first output beam and the second output beam.

7. A method as claimed in claim 1, in which the determining of the difference between the absolute phase offset of the first output beam and the absolute phase offset of the second output beam is done using one or more wavelength meters.

8. A method as claimed in claim 1, comprising using knowledge of the difference between the absolute phase offset of the first output beam and the absolute phase offset of the second output beam for both the reference interferometer and the measurement interferometer to set a parameter indicative of the absolute phase offset of the interference signal resulting from the first beam in the measurement interferometer to be equal to a parameter indicative of the absolute phase offset of the interference signal resulting from the second beam in the measurement interferometer, thereby providing the parameter indicative of the absolute phase offset of the measurement interferometer.

9. A method as claimed in claim 1, in which the distinguishing between, on the one hand, interference data resulting from the first output beam from, on the other hand, interference data resulting from the second output beam is done by identifying data consistent with the varying of the optical frequencies of the first laser and the second laser, respectively, in both the reference interference data and the measurement interference data.

10. A method as claimed in claim 1, in which the calculation of the parameter indicative of the absolute phase offset of the measurement interferometer for the first output beam includes obtaining at least two different measurements of the phase difference of an interference signal in the reference interference data from the first output beam, the phase difference of an interference signal in the reference interference data from the second output beam, the phase difference of an interference signal in the measurement interference data from the first output beam, and the phase difference of an interference signal in the measurement interference data from the second output beam.

11. A method as claimed in claim 10, in which the calculation of the parameter includes combining those phase differences with a parameter, of known value, indicative of the absolute phase offset of the reference interferometer.

12. A method as claimed in claim 11, in which there are more than two measurements of those phase differences, and the calculation of the parameter indicative of the absolute phase offset of the measurement interferometer for the first output beam includes using the method of least squares on those measurements.

13. A method as claimed in claim 1, in which the calculation of the ratio of the optical path differences of the measurement interferometer and the reference interferometer includes using the phase difference of an interference signal in the reference interference data from the first output beam, the phase difference of an interference signal in the reference interference data from the second output beam, the phase difference of an interference signal in the measurement interference data from the first output beam, and the phase difference of an interference signal in the measurement interference data from the second output beam.

14. An interferometer array for tracking the position of an object, comprising:

a first laser for providing a first output beam;

a second laser for providing a second output beam, with at least one of the first and second lasers configured to have an optical frequency that can be controllably varied with time;

a reference interferometer having arms with a known optical path difference;

a measurement interferometer having arms with an unknown optical path difference, the unknown optical path difference giving rise to an interferometer phase difference, consisting of an absolute phase offset and an unwrapped phase for the first output beam and for the second output beam;

the first and second lasers being arranged to direct the first and second output beams simultaneously into both the reference interferometer and the measurement interferometer; and signal processing apparatus configured to:

identify for both the reference interferometer and the measurement interferometer the difference between the absolute phase offset of the first output beam and the absolute phase offset of the second output beam;

obtain reference interference data from the reference interferometer and measurement interference data from the measurement interferometer;

distinguish, on the one hand, interference data resulting from the first output beam from, on the other hand, interference data resulting from the second output beam, in both the reference interference data and the measurement interference data;

use the reference interference data from the first output beam, the reference interference data from the second output beam, the measurement interference data from the first output beam, the measurement interference data from the second output beam, and knowledge of the difference between the absolute phase offset of the first output beam and the absolute phase offset of the second output beam for both the reference interferometer and the measurement interferometer to calculate a parameter indicative of the absolute phase offset of the measurement interferometer for the first output beam; and
use the calculated parameter to calculate the ratio of the optical path differences of the measurement interferometer and the reference interferometer.

15. An interferometer array as claimed in claim 14, including a photodetector arranged to detect a zero frequency point in a beat signal between the first output beam and the second output beam.

16. An interferometer array as claimed in claim 15, including a wavemeter and signal processing apparatus arranged to determine the difference in absolute phase offset between the first output beam and the second output beam.

17. An interferometer array as claimed in claim 14, in which the interferometers share components.

18. An instrument comprising the interferometer array of claim 14.

* * * * *